US012411973B2

(12) United States Patent
Mukherjee et al.

(10) Patent No.: US 12,411,973 B2
(45) Date of Patent: Sep. 9, 2025

(54) SYSTEM AND METHOD FOR ENHANCED ENCRYPTION ORCHESTRATION AND APPLICATION INTEGRATION FRAMEWORK

(71) Applicant: BANK OF AMERICA CORPORATION, Charlotte, NC (US)

(72) Inventors: Maharaj Mukherjee, Poughkeepsie, NY (US); Dihong Qiu, Plainsboro, NJ (US); Sanjeeb Kumar Sahoo, Jersey City, NJ (US); Venkat P. Ravula, South Brunswick, NJ (US); Veerandra S. Srivastava, Plainsboro, NJ (US); Riazuddin Khaja, Fuquay Varina, NC (US); Swetha Guddannagari, Princeton, NJ (US); Mayank Sharma, Edison, NJ (US); Esada Qazi, Roseland, NJ (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 133 days.

(21) Appl. No.: 18/504,824

(22) Filed: Nov. 8, 2023

(65) Prior Publication Data
US 2025/0148109 A1   May 8, 2025

(51) Int. Cl.
G06F 21/62 (2013.01)
G06F 9/54 (2006.01)
G06F 21/60 (2013.01)

(52) U.S. Cl.
CPC ......... *G06F 21/6218* (2013.01); *G06F 9/547* (2013.01); *G06F 21/602* (2013.01)

(58) Field of Classification Search
CPC ..... G06F 21/6218; G06F 21/602; G06F 9/547
See application file for complete search history.

(56) References Cited

U.S. PATENT DOCUMENTS

| 9,300,639 | B1 | 3/2016 | Roth |
| 9,438,579 | B2 | 9/2016 | Evans |
| 9,459,925 | B2 | 10/2016 | Lawson |
| 9,547,771 | B2 | 1/2017 | Roth |
| 9,805,206 | B2 * | 10/2017 | Gounares ............ H04L 63/1433 |
| 9,875,372 | B2 * | 1/2018 | Stuntebeck ......... G06F 21/6245 |
| 9,887,975 | B1 | 2/2018 | Gifford |
| 10,090,998 | B2 | 10/2018 | Roth |
| 10,210,341 | B2 | 2/2019 | Roth |
| 10,404,670 | B2 | 9/2019 | Roth |

(Continued)

*Primary Examiner* — Sargon N Nano
(74) *Attorney, Agent, or Firm* — Moore & Van Allen PLLC; Nicholas C. Russell

(57) ABSTRACT

Systems, computer program products, and methods are described herein for enhanced encryption orchestration and application integration frameworks. The system performs steps of initializing a broker application to act as a data security broker within a computing environment; providing an application programming interface (API) for external application interaction; receiving and processing requests via the API for access to encrypted code and data; containerizing the code and data within an isolated environment, subject to predefined rules; monitoring usage to ensure adherence to these rules; initiating self-destruction of the container upon reaching a predetermined usage limit or condition; and securely erasing all sensitive data and code after usage completion.

20 Claims, 4 Drawing Sheets

(56) References Cited

U.S. PATENT DOCUMENTS

| | | | |
|---|---|---|---|
| 10,474,829 B2 | 11/2019 | Roth | |
| 10,769,287 B2 | 9/2020 | Roth | |
| 10,826,708 B2 | 11/2020 | Campagna | |
| 11,226,945 B2 | 1/2022 | Smart | |
| 11,323,479 B2 | 5/2022 | Roth | |
| 11,372,993 B2 | 6/2022 | Roth | |
| 11,431,757 B2 | 8/2022 | Roth | |
| 11,470,054 B2 | 10/2022 | Roth | |
| 11,546,156 B1 | 1/2023 | Hendry | |
| 11,695,555 B2 | 7/2023 | Roth | |
| 11,750,609 B2 | 9/2023 | Gilpin | |
| 11,803,658 B1* | 10/2023 | Jonak | G06F 21/6245 |
| 11,924,165 B2* | 3/2024 | McDowall | H04L 63/14 |
| 11,991,155 B2* | 5/2024 | Ackerly | H04L 9/085 |
| 2014/0229732 A1 | 8/2014 | Roth | |
| 2016/0357424 A1* | 12/2016 | Pang | H04L 1/242 |
| 2020/0142725 A1* | 5/2020 | Resende | G06F 9/45558 |
| 2021/0026700 A1* | 1/2021 | Manickam | G06F 9/5055 |
| 2021/0281548 A1* | 9/2021 | Ackerly | H04L 67/60 |
| 2024/0272947 A1* | 8/2024 | Kumar | G06F 9/5083 |
| 2024/0289189 A1* | 8/2024 | More | G06F 8/60 |

\* cited by examiner

SYSTEM AND METHOD FOR ENHANCED ENCRYPTION ORCHESTRATION AND APPLICATION INTEGRATION FRAMEWORK

TECHNOLOGICAL FIELD

Example embodiments of the present disclosure relate to the field of data security, particularly addressing the challenges faced by entities that need to share sensitive or proprietary data.

BACKGROUND

Entities that need to share sensitive or proprietary data with developers across various geographies are often faced with complex difficulties. At time, problems arise particularly due to the disparity in secure infrastructure and enforcement mechanisms across different regions, which can compromise the security of shared data.

Applicant has identified a number of deficiencies and problems associated with encryption orchestration and application integration frameworks. Through applied effort, ingenuity, and innovation, many of these identified problems have been solved by developing solutions that are included in embodiments of the present disclosure, many examples of which are described in detail herein

BRIEF SUMMARY

Systems, methods, and computer program products are provided for enhanced encryption orchestration and application integration frameworks. The invention presents a novel approach to data security by introducing several distinctive features. At its core, the invention involves creation of an innovative application that serves as a broker, equipped with specific application programming interfaces (APIs). This design allows other applications to seamlessly interact with these APIs, enabling them to inject and utilize fully encrypted code and data that adhere to predefined specifications.

Additionally, the invention facilitates these applications to carry out activities using the provided code and data. A notable aspect of the claimed system is a pre-determined usage limit, which triggers the self-destruction of a container upon reaching this usage limit, thereby effectively eliminating code and data within the container. Moreover, the invention incorporates a generation of a unique key, which is distributed to a calling application through an API for encryption. This key is crucial, as the broker uses it for the subsequent decryption process. Collectively, these features establish the invention as a comprehensive and robust solution for complete data security, particularly in situations where data needs to be shared across diverse geographical locations with varying levels of security infrastructure.

In some embodiments, the invention generally includes the steps of initializing a broker application to act as a data security broker within a computing environment; providing an application programming interface (API) through the broker application for external application interaction; receiving and processing a request from an external application via the provided API for access to encrypted code and data; containerizing the encrypted code and data within an isolated environment, wherein the container is subject to predefined rules governing access and usage; monitoring usage of containerized code and data to ensure adherence to the predefined rules governing access and usage; initiating self-destruction of the container upon reaching a predetermined usage limit or condition; and securely erasing all sensitive data and code after use.

In further embodiments, the system is further configured to: generate a unique encryption key for each instance of code and data interaction, disseminating the key to the calling application via the provided API.

In further embodiments, the system is further configured to: implement predefined rules within each container of the containerized code and data, dictating conditions for accessing and using the contents.

In further embodiments, the conditions for accessing and using the contents further comprise a limited number of accesses or application-specific access to the contents.

In further embodiments, the system is further configured to: allow for configurable usage limits on the containerized code and data, wherein the limits are defined based on number of uses or time-based criteria.

In further embodiments, the system is further configured to: utilize cloud-based environments and services to host the broker application.

In further embodiments, the system is further configured to: provide a logging mechanism, documenting all interactions with the containerized code and data, including access requests, usage patterns, and self-destruction events.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below.

BRIEF DESCRIPTION OF THE DRAWINGS

Having thus described embodiments of the disclosure in general terms, reference will now be made the accompanying drawings. The components illustrated in the figures may or may not be present in certain embodiments described herein. Some embodiments may include fewer (or more) components than those shown in the figures.

Figure 1A:
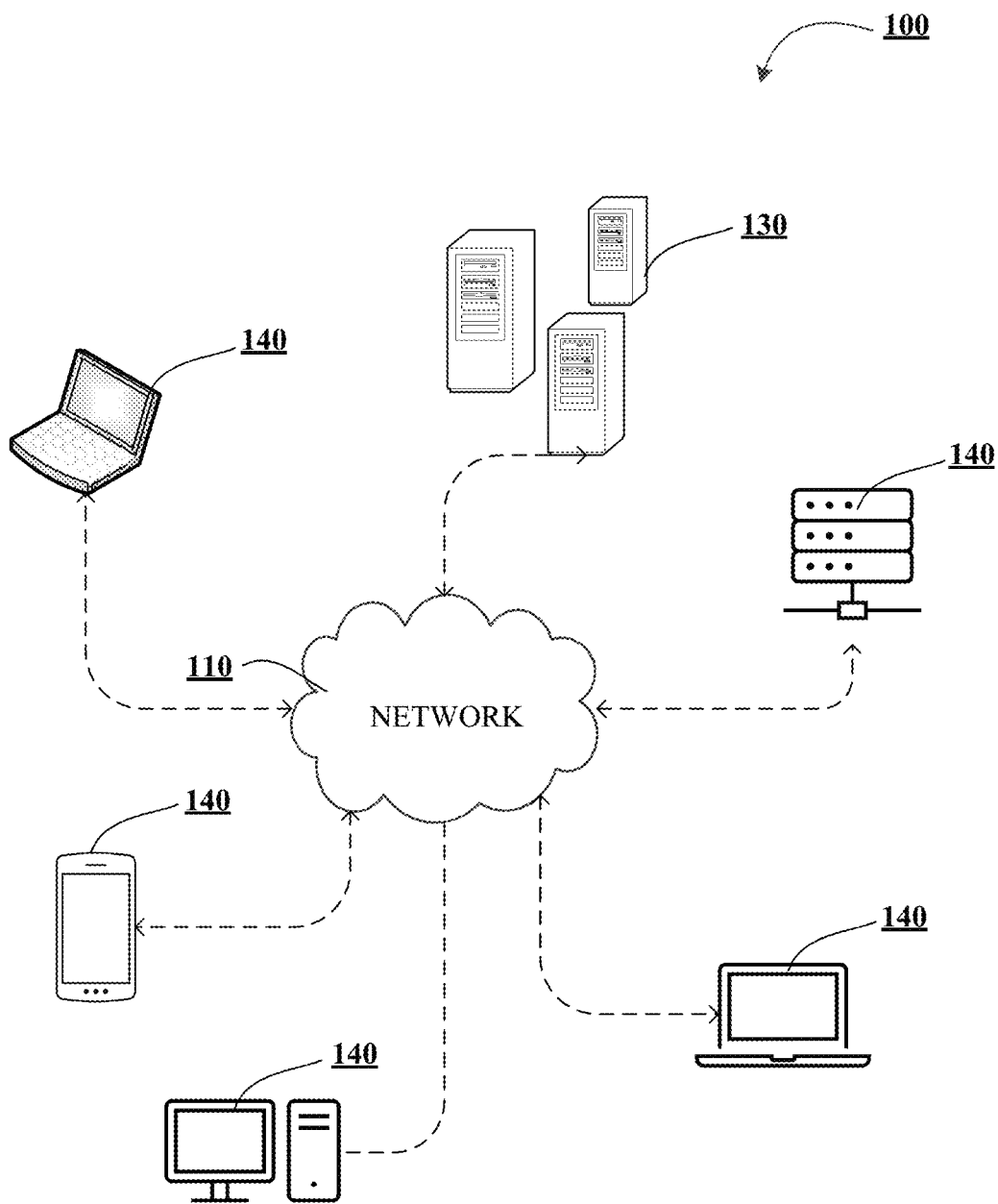
Figure 1B:
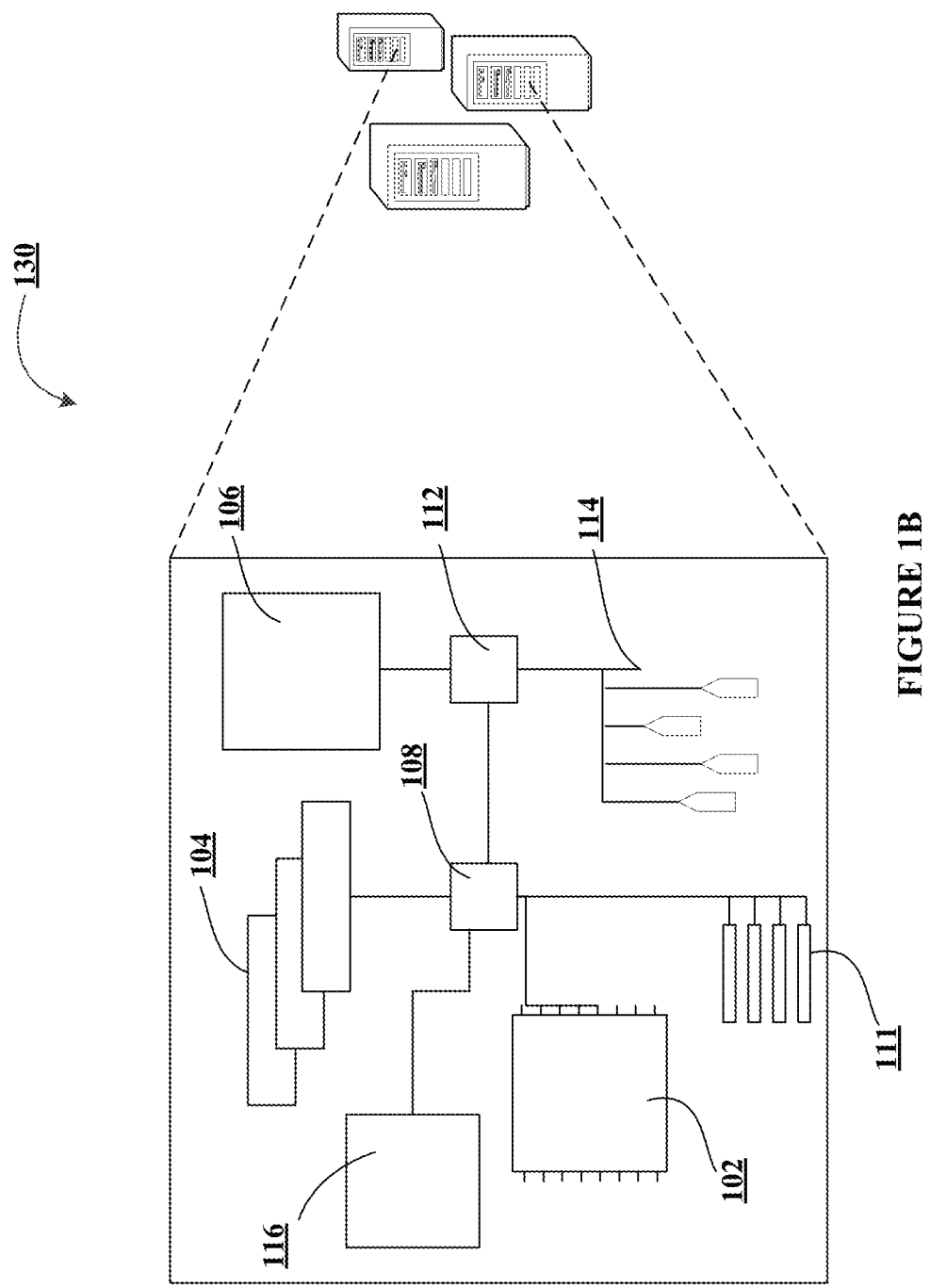
Figure 1C:
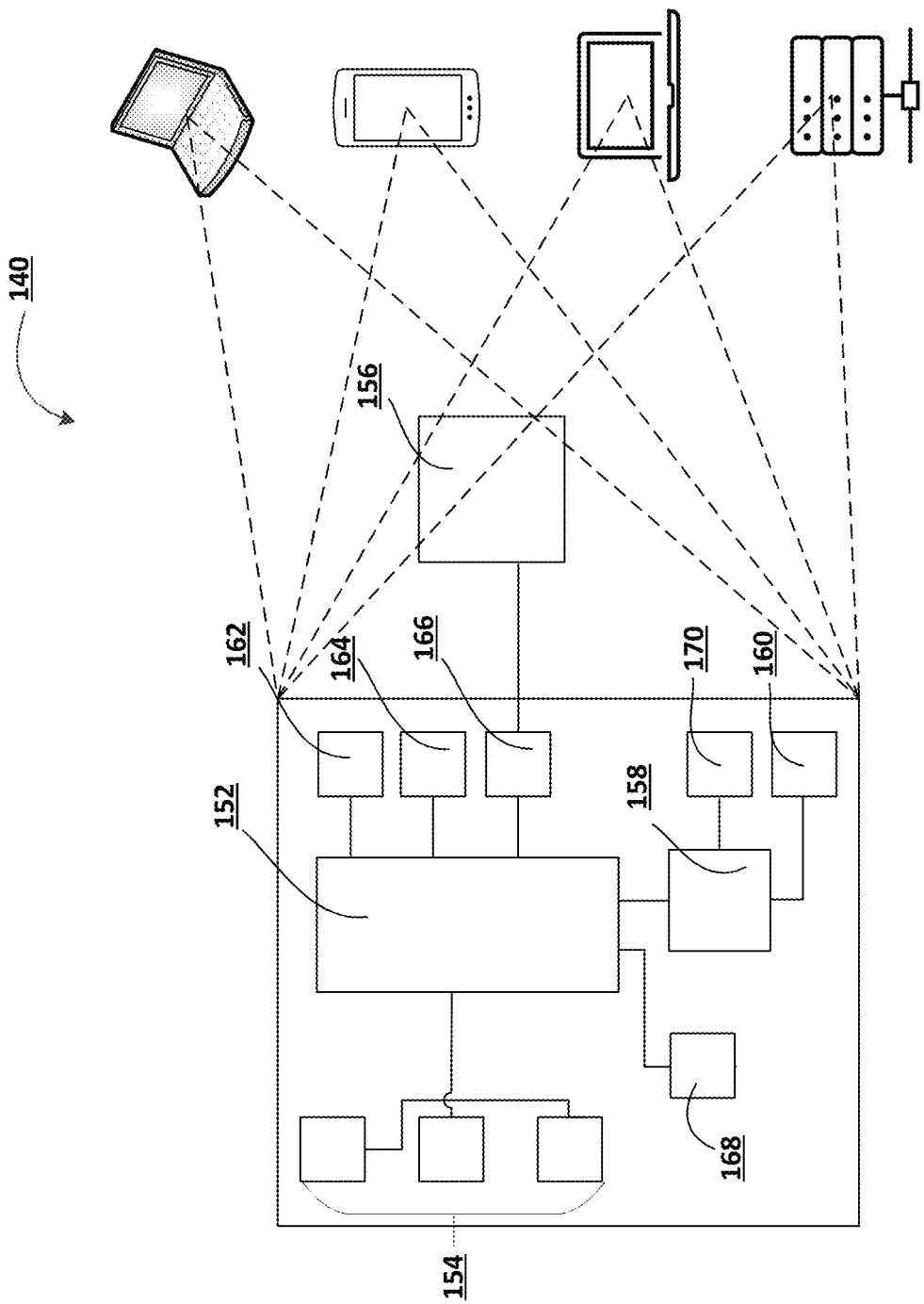
Figure 2:
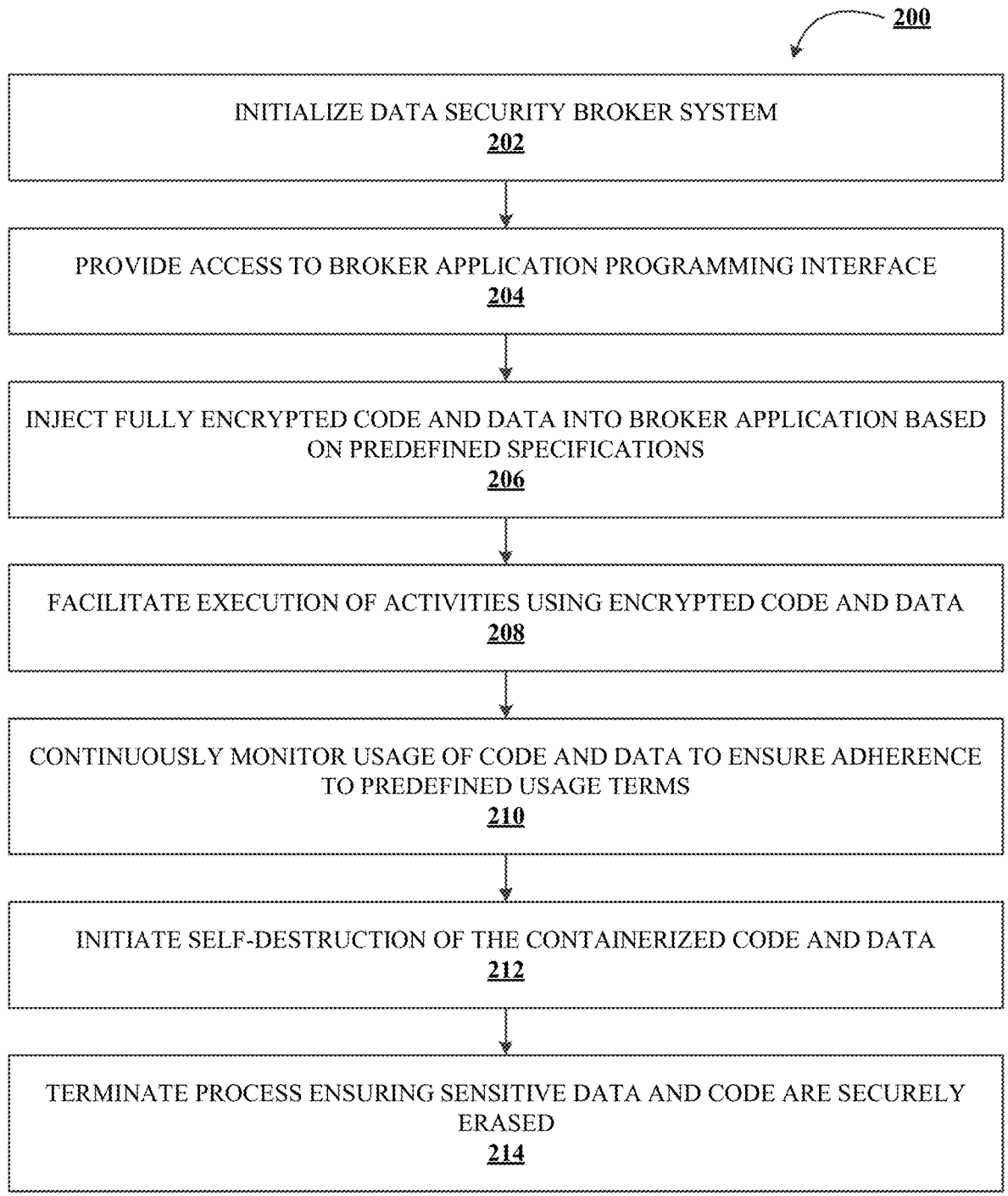

FIGS. 1A-1C illustrate technical components of an exemplary distributed computing environment for enhanced encryption orchestration and application integration frameworks, in accordance with an embodiment of the disclosure;

FIG. 2 illustrates a process flow 200 for enhanced encryption orchestration and application integration frameworks, in accordance with an embodiment of the disclosure.

DETAILED DESCRIPTION

Embodiments of the present disclosure will now be described more fully hereinafter with reference to the accompanying drawings, in which some, but not all, embodiments of the disclosure are shown. Indeed, the disclosure may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, a "container" refers to a virtualized, isolated environment within which specific code and data reside and operate. In the context of the invention, a container acts as a secure, self-contained unit that may hold fully encrypted code and data injected by other applications, which, in some embodiments, is injected through the use of one or more APIs. In some embodiments, containers are designed to provide an additional layer of security by isolating the code and data from the rest of the system or network components, ensuring that the code and data remain inaccessible and protected from external threats. Moreover, in some embodiments, the containers of the invention are programmed with a self-destruct mechanism that is activated upon completion of a predetermined number of uses by the end user or system incorporating the code or data. This feature ensures that once the activities are completed, the container, along with its contents, is securely and irrevocably erased, further enhancing the security of the sensitive data and code embedded within the container.

Containers in software and technology encapsulate applications and their dependencies, offering isolation from other processes. A prominent type of container technology involves a platform that encapsulates applications, dependencies, and configurations into a single package. The creation process utilizes scripts containing build commands for the container image. These images are then stored in registries, making them accessible for deployment on any system with the container platform installed. This technology is known for ease of deployment, consistency across environments, and scalability.

In the realm of container orchestration, there are systems like Kubernetes, which, although often used in conjunction with other container technologies, offers a unique orchestration system for managing containerized applications. It groups containers into pods, the smallest deployable units, and provides features like automatic scaling and load balancing, making it ideal for complex, large-scale deployments. Linux Containers (LXC/LXD) provide a more low-level environment. These offer lightweight virtual environments with user space isolation while sharing the host's kernel. LXC resembles a streamlined virtual machine, while LXD builds upon LXC, enhancing user experience and functionality. These containers are especially adept at running complete Linux distributions.

In the Windows environment, there are specific containers designed for Windows systems. These come in two types: one sharing the host kernel and another providing stronger isolation. Manageable via container platforms and orchestrateable through systems like Kubernetes, these containers are suitable for Windows-based applications. OpenVZ Containers represent another variation. This Linux-based solution allows a physical server to run multiple isolated operating system instances, or containers. Known for efficiency and ease of setup compared to full virtual machines, OpenVZ is a valuable tool for creating isolated environments. Serverless container platforms, like those offered by various cloud computing services, bring containerization into the serverless realm. These platforms manage the infrastructure, scaling, and provisioning automatically, enabling the deployment of containers without the need for server management. This model suits applications with variable workloads or those who prefer not to manage server infrastructure. In terms of coding and engineering, containers are typically defined using configuration files that specify the application, its dependencies, and environmental settings. Container images are then built based on these configurations and stored in registries. Provisioning involves running these images on container runtime environments, which could be a local machine, a dedicated container host, or a cloud-based service.

In sum, one of ordinary skill in the art will appreciate that containers offer a flexible, portable, and consistent way to deploy applications across different environments. They provide isolation from the underlying infrastructure, enhance security, and simplify dependency management, thus becoming essential tools in modern software development and deployment.

As used herein, the term "broker" refers to a specialized software application that plays a pivotal role in managing and securing data transactions. Within the context of this invention, the broker acts as an intermediary platform that facilitates secure interactions between different applications and the protected data. In some embodiments, the broker provides access to a set of application programming interfaces (APIs) through which external applications can request access to, or perform operations on, the fully encrypted code and data. The broker is designed to handle these requests, ensuring that all data transactions are conducted within a secure and controlled environment. Additionally, it is responsible for the encryption and decryption processes, utilizing a unique key provided to the calling applications via an API. In some embodiments, the primary function of the broker is to maintain the integrity and confidentiality of the data while allowing necessary access for development and testing purposes.

The term "broker" in this context denotes two distinct yet interconnected entities: the "broker application" and the "secure data broker system" or "broker system." The "broker application" refers to a specialized software component that serves as the operational core within the broader architecture. It manages and secures data transactions, acting as an intermediary platform that orchestrates secure interactions between various applications and protected data. This component is chiefly responsible for providing access to a suite of application programming interfaces (APIs), through which external applications can request access to, or perform operations on, the fully encrypted code and data. On the other hand, the "secure data broker system" or "broker system" represents the larger, holistic framework that encompasses not only the broker application but also other integrated components and infrastructures. This system provides a comprehensive environment for data security, where the broker application operates as a key element. While the broker application focuses on the immediate tasks of encryption, decryption, and handling API requests, the broker system encompasses the overall architecture, including security protocols, containerization processes, monitoring mechanisms, and other elements crucial for maintaining the integrity and confidentiality of data. Together, they form a robust mechanism ensuring secure data transactions, with the broker application acting as the pivotal operational node within the expansive broker system.

As used herein, an "application programming interface (API)" refers to a set of protocols, tools, and definitions for building application software and enabling different software applications to communicate with each other. In the context of the invention, APIs serve as a crucial communication gateway between the broker application and other external applications. APIs provide the means for these external applications to request and use fully encrypted code and data in a secure manner. The APIs provided by the broker are designed to ensure controlled access, facilitating interactions like data retrieval, execution of activities, and encryption and decryption processes. Furthermore, they play a key role in managing the security aspects by handling encryption keys and maintaining the integrity of data transactions. The use of APIs in this invention is fundamental to enabling a secure, efficient, and controlled environment for data sharing and processing.

APIs are fundamental tools in the realm of software development, serving as bridges for communication and interaction between various systems and applications. There are several types of APIs, each crafted for distinct purposes and environments, and their coding, engineering, and provisioning methodologies differ based on these types. Web APIs are designed primarily for server-to-server communication and are commonly utilized in web-based applications. These APIs often adhere to RESTful (Representational State Transfer) or SOAP (Simple Object Access Protocol) standards. RESTful APIs employ standard HTTP methods like GET, POST, PUT, and DELETE and typically exchange data in JSON or XML formats. Conversely, SOAP APIs utilize XML for data exchange and adhere to more stringent protocols. Web APIs are provisioned through web servers and are accessible over the internet using standard web protocols. In contrast, library-based APIs form part of a software library, offering a set of functions and procedures for executing specific tasks within software applications. These are coded as part of a library in a specific programming language, allowing developers to incorporate these libraries into their code and directly call API functions. Library-based APIs are generally distributed as part of software development kits (SDKs) or as standalone libraries.

Class-based APIs, with their object-oriented nature, provide access to classes and their methods in a programming language. They are embedded within a class structure, enabling developers to create objects and access methods and properties. Similar to library-based APIs, these are often part of SDKs or frameworks. Operating System APIs play a crucial role in enabling software to interact with the underlying operating system. They facilitate the use of system resources, file systems, and other essential services. These APIs are engineered to interact with system kernels and hardware and are typically written in low-level languages for efficiency. They are integrated into the operating system, making them available for all applications running on that system. Hardware APIs allow software to communicate with hardware devices like printers, cameras, or sensors. They are coded to interface with device drivers and hardware firmware, often utilizing specific communication protocols. Hardware manufacturers typically provide these APIs, which can be integrated into applications or operating systems. Database APIs, on the other hand, provide an interface for interacting with database systems. They enable operations such as querying, updating, and managing data. These APIs can be engineered using SQL (Structured Query Language) or other query languages and are commonly part of database management systems. They are typically bundled with the database management software.

Irrespective of the type, engineering APIs requires a focus on security, encompassing authentication, authorization, and data encryption. Proper documentation is also crucial for the usability and adoption of APIs. Moreover, they should be designed for scalability to handle varying loads efficiently and maintain backward compatibility to support existing applications. In essence, the design and implementation of APIs are tailored to their type and intended functionality. Well-engineered APIs are vital in enabling seamless and secure interactions between different software components and systems, playing a pivotal role in the modern technological landscape.

In the specialized setting of the present invention, system and method for data security broker for complete data security, the utilization of Web APIs, particularly RESTful APIs, may be a preferred embodiment. This selection is underpinned by several pivotal attributes that align with the core requirements of the solution. Firstly, the secure data transactions that RESTful Web APIs facilitate are crucial. The invention hinges on sharing sensitive data with developers scattered across diverse geographies, and these APIs excel in securely managing data exchanges over the internet or networks. Their capability to handle such transactions securely is paramount for the integrity of the system.

Another significant advantage of RESTful APIs is their scalability. The nature of the invention implies that multiple developers might access the data simultaneously. RESTful APIs can efficiently handle a high volume of requests, ensuring smooth and uninterrupted access for all users. One of ordinary skill in the art will also appreciate that the statelessness of RESTful APIs is also a critical feature that complements the invention. In such APIs, each request from the client to the server contains all the necessary information to understand and complete the request. This characteristic ensures that sensitive data isn't retained between transactions, bolstering the overall security of the system.

Furthermore, one of ordinary skill in the art will appreciate that the flexibility and simplicity of RESTful APIs cannot be overstated. They offer seamless interaction with different systems and can return data in various formats like JSON or XML. This adaptability is invaluable for developers working in diverse programming environments, ensuring that the system is versatile and user-friendly. Ease of integration is another cornerstone of Web APIs. Given that the invention encompasses an application acting as a broker with exposed APIs, it is imperative to have APIs that external applications can easily consume and interact with. RESTful APIs' compatibility and ease of integration make them an ideal choice in this scenario. Lastly, the robust encryption and security protocols that Web APIs support may be preferred in exemplary embodiments. Web APIs can be configured to use HTTPS for secure communication and support various authentication and authorization mechanisms, ensuring that the data remains protected throughout the process. In essence, RESTful Web APIs provide the necessary security, scalability, and flexibility required for the system and method for data security broker for complete data security. They offer a practical, efficient, and secure way to manage the sharing of sensitive data among developers across different geographic locations.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

It should be understood that the word "exemplary" is used herein to mean "serving as an example, instance, or illustration." Any implementation described herein as "exemplary" is not necessarily to be construed as advantageous over other implementations.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

This disclosure introduces a cutting-edge technological approach to enhancing data security across diverse geographic locations. The problem faced in the field revolves around the need to securely share sensitive or proprietary data with developers in various geographies, where complete data security cannot always be guaranteed due to varying infrastructure and legal systems. The solution involves a system and method for data security broker for complete data security. This system acts as a secure intermediary, ensuring that data shared with developers for testing remains fully protected and inaccessible to unauthorized parties.

Accordingly, the present disclosure encompasses an innovative application that serves as a broker with specific APIs, enabling fully encrypted code and data injection and usage based on set specifications. Additionally, it facilitates controlled execution of activities using this code and data, with a self-destruct feature for containers post-use, and generates a key for encryption, distributed via an API and utilized by the broker for decryption.

What is more, the present disclosure provides a technical solution to a technical problem. As described herein, the technical problem includes the challenge of ensuring complete data security when sharing sensitive data with developers in areas with potentially insecure infrastructure or inadequate legal protections. The technical solution presented herein allows for secure data sharing and interaction without exposing sensitive information. In particular, the system and method for Data Security Broker is an improvement over existing solutions to the data security problem, (i) with fewer steps to achieve the solution, thus reducing the amount of computing resources, such as processing resources, storage resources, network resources, and/or the like, that are being used, (ii) providing a more accurate solution to problem, thus reducing the number of resources required to remedy any errors made due to a less accurate solution, (iii) removing manual input and waste from the implementation of the solution, thus improving speed and efficiency of the process and conserving computing resources, (iv) determining an optimal amount of resources that need to be used to implement the solution, thus reducing network traffic and load on existing computing resources. Furthermore, the technical solution described herein uses a rigorous, computerized process to perform specific tasks and/or activities that were not previously performed. In specific implementations, the technical solution bypasses a series of steps previously implemented, thus further conserving computing resources.

FIGS. 1A-1C illustrate technical components of an exemplary distributed computing environment 100 for enhanced encryption orchestration and application integration frameworks, in accordance with an embodiment of the disclosure. As shown in FIG. 1A, the distributed computing environment 100 contemplated herein may include a system 130, an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned.

The end-point device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the disclosures described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the disclosure. As shown in FIG. 1B, the system 130 may include a processor 102, memory 104, input/output (I/O) device 116, and a storage device 110. The system 130 may also include a high-speed interface 108 connecting to the memory 104, and a low-speed interface 112 connecting to low speed bus 114 and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein, including those integral to the system and method for data security broker for complete data security. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 110, for execution within the system 130 using any subsystems described herein. It is to be understood that the system 130 may use, as appropriate, multiple processors, along with multiple memories, and/or i/o devices, to execute the processes described herein, including those pertaining to the novel system and method for data security broker for complete data security.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, including those relevant to the system and method for data security broker for complete data security, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above, specifically including the implementation of the system and method for data security broker for complete data security. The information carrier may be a non-transitory computer- or machine-readable storage medium, such as the memory 104, the storage device 104, or memory on processor 102. The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, the system 130 may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the disclosure. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation- and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert the spoken information to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130. Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

FIG. 2 illustrates a process flow 200 for enhanced encryption orchestration and application integration frameworks, in accordance with an embodiment of the disclosure. A shown in block 202, the process begins with the initialization of the data security broker system. The initiation phase marks the beginning of the process where the data security broker system is activated for use. From a computing perspective, this initiation involves the deployment of the broker application on a suitable hardware environment. This hardware may comprise a server or a network of servers, equipped with processing power and memory capabilities to handle the demands of the broker system. The broker application is installed and configured on this hardware setup. During the installation, necessary dependencies and libraries required for the application's optimal performance are also set up.

Once the broker application is installed, it undergoes a series of initializations. These initializations involve setting up the environment, loading configurations, and establishing connections to necessary services or databases. For instance, the application might connect to a secure database for storing keys or a logging service for audit trails. In an exemplary embodiment, the system might also perform self-checks to ensure all components are functioning as expected. This phase is crucial as it lays the groundwork for the application to operate effectively and securely.

After the application is initialized, it transitions to providing access to its application programming interfaces (APIs), as shown in block 204. This is a critical step where the broker application makes certain functionalities available to external applications. The APIs act as gateways through which external applications can interact with the broker system. For example, an API might allow an external application to submit encrypted code for processing or request a data sample for development purposes. In an embodiment, these APIs could be RESTful interfaces, allowing for easy integration with a wide range of external applications. The exposure of APIs is managed securely, ensuring that only authorized applications can discover and access these APIs. This might involve API key authentication, OAuth tokens, or other security mechanisms to prevent unauthorized access. This initiation stage sets the stage for the entire data security broker system, establishing a robust and secure foundation upon which subsequent processes like encryption, execution, and self-destruction are built. It ensures that the system is primed and ready to handle the sensitive task of managing encrypted code and data, safeguarding it from initiation to termination.

As shown in block 206, the process continues via the injection of fully encrypted code and data into broker application based on predefined specifications. The encryption phase is a critical step in the data security broker system, where the secure exchange and handling of sensitive information begins. From a computing and hardware perspective, this phase leverages the robust infrastructure set up during the initiation phase, including powerful servers, secure connections, and well-defined APIs. In this stage, external applications, which could be running on different platforms or networks, start interacting with the broker application through the previously provided APIs. This interaction is akin to a dialogue where the external applications request certain services or submit data, and the broker application responds appropriately. To ensure secure communication, these interactions often occur over encrypted channels, such as HTTPS, preventing any data interception or tampering during transmission.

A core aspect of this phase is the injection of fully encrypted code and data into the broker application. External applications encrypt their code and data based on predefined specifications, which could include specific encryption algorithms, key lengths, or data formats. These specifications are crucial to maintain a uniform security standard and to ensure compatibility with the broker system. Once encrypted, this code and data are transmitted to the broker application via the APIs. An exemplary embodiment might involve an external application encrypting a sensitive algorithm and then submitting it to the broker for processing or safekeeping.

Concurrently, the generation of an encryption key takes place. This key is vital for maintaining the confidentiality and integrity of the data. In some embodiments, the broker application might generate a unique encryption key for each interaction, ensuring that each transaction remains secure and isolated. This key is then disseminated to the calling application via an API, effectively creating a secure handshake. The calling application can use this key to encrypt further communications or to decrypt responses from the broker. In some advanced embodiments, the broker might implement key management protocols, regularly updating or rotating keys to bolster security.

Throughout this phase, the emphasis is on maintaining a seamless yet secure flow of data between external applications and the broker. By meticulously managing the interaction and encryption processes, the data security broker system ensures that sensitive code and data are securely handled, setting the stage for subsequent processing and usage within a fortified environment. Containerization plays a pivotal role in the data security broker system, particularly in the data injection and encryption phase. When the fully encrypted code and data are injected into the broker application, they are not simply stored as raw files or entries in a database. Instead, they are encapsulated within secure containers. These containers can be visualized as digital vaults or isolated environments, each housing a specific set of code and data. This compartmentalization enhances security by segregating different pieces of information, ensuring that they do not inadvertently interact or compromise each other.

The containerization of code and data serves a dual purpose. Firstly, it adds an additional layer of security. Each container can be equipped with its own set of encryption protocols, access controls, and monitoring mechanisms. This means that even if an unauthorized entity gains access to one container, the breach remains contained and does not affect the others. Secondly, and crucially for the data security broker system, containerization allows for precise control over the usage of the enclosed code and data. The broker application can monitor and regulate how many times, and in what manner, the contents of each container are accessed or utilized. This is particularly significant for scenarios where the usage of certain code or data needs to be strictly limited, either for security reasons or due to licensing agreements.

In some embodiments, the broker application may implement smart contracts or predefined rules within each container, stipulating the conditions under which the contents can be used. For instance, a container might be programmed to allow its contents to be accessed only a certain number of times, or exclusively by specific applications. **This programming is achieved through intricate configuration files that detail the application's operational parameters, dependencies, and environmental settings. Once these conditions are met or exceeded, the container can trigger a self-destruction mechanism, which may involve the deletion of cryptographic keys or the overwriting of memory spaces, thereby ensuring that the enclosed code and data are securely eradicated beyond recovery. This automated, rule-based approach ensures that the usage of sensitive information is tightly controlled, preventing unauthorized or excessive use.

By leveraging containerization in this way, utilizing technologies such as Kubernetes for orchestration, LXC/LXD for Linux environments, or Windows-specific containers for Microsoft-based systems, the data security broker system not only protects the data but also enforces its responsible and compliant utilization in diverse infrastructures. As indicated in block 208, the process also includes facilitating execution of activities using encrypted code and data from the containerization described with respect to block 206. The execution and use phase is a critical component of the data security broker system, where the real-world application of the secured code and data takes place. At this stage, external applications, which could range from data analysis tools to customer-facing platforms, are granted the capability to utilize the encrypted code and data housed within the broker application. This process is meticulously orchestrated to ensure security and compliance with pre-established usage protocols.

From a computing and hardware perspective, the initialization of this phase may involve the broker application running on a dedicated server or a cloud-based environment equipped with robust security measures. The external applications seeking to use the provided code and data typically communicate with the broker application through secure channels, which in some embodiments may utilize encrypted messaging or API calls. This communication is key to initiating the use of the protected data. The broker application, upon receiving a valid request from an external application, retrieves the relevant encrypted code or data from its container, decrypts it using the previously generated key, and makes it available for use. In some embodiments, upon validation of the request, the broker application decrypts the data and provides it to the tool for analysis. Importantly, the broker application monitors this activity, ensuring that the usage aligns with the predetermined number of uses. In some embodiments, this could be a set number of data retrievals or a specific duration of use.

In more advanced implementations, the broker application may also facilitate the execution of activities by providing a virtualized or sandboxed environment where the external applications can run the code or process the data. This is particularly useful for complex operations that require isolation from the main system for security reasons. For example, an AI-based diagnostic tool might use a piece of encrypted analysis code from the broker. The broker application not only provides the code but also creates a secure, temporary environment where the tool can run the code, analyze patient data, and provide insights, all while ensuring that the code is not exposed or misused. Throughout this phase, the broker application acts as a secure data dissemination tool, controlling access to the encrypted data, facilitating their secure use, and enforcing the pre-agreed terms of use. By doing so, the data security broker system ensures that sensitive code and data are used effectively for their intended purposes, while maintaining the highest levels of security and compliance with entity policy.

As further indicated in block 210, the process includes continuously monitoring usage of code and data to ensure adherence to predefined usage terms. The monitoring and control phase is a pivotal component of the data security broker system, where the broker application ensures that the use of encrypted code and data adheres strictly to predefined usage terms. This phase is characterized by continuous surveillance and management of how, when, and how often the secured data is accessed and utilized.

From a computing and hardware perspective, this monitoring process typically involves sophisticated software running on the broker application, which itself is hosted on secure and robust servers or cloud environments. In some embodiments, these systems are equipped with advanced monitoring tools and analytics software capable of tracking each instance of code or data access. The initialization of this phase occurs seamlessly as soon as the external applications start interacting with the exposed APIs for using the encrypted data. In some embodiments, this might involve the broker application logging every API call made by external applications, tracking the frequency of data retrievals, or recording the execution instances of a particular piece of code. For example, if an organization is granted access to a proprietary dataset for a limited number of analyses, the broker application meticulously records each data retrieval or analysis event. This not only ensures compliance with the agreed terms but also provides an audit trail for future reference.

Furthermore, the broker's monitoring capabilities extend beyond mere count tracking. In some embodiments, this involves analyzing usage patterns to detect any anomalies or unauthorized attempts to access the data or code. This could mean identifying unusual spikes in data requests or detecting attempts to bypass usage limitations. In such scenarios, the broker application can initiate preventive measures, such as temporarily restricting access or alerting system administrators for further investigation. In more advanced systems, this monitoring process can also be dynamic and adaptive. For instance, if the broker detects that a particular piece of code is being used more frequently than anticipated, it can dynamically adjust the predefined usage terms in real-time, after seeking appropriate approvals. This ensures a balance between security and flexibility, adapting to changing usage patterns while maintaining the integrity of the data. Overall, the monitoring and control phase serves as a critical safeguard within the data security broker system, ensuring that all interactions with the sensitive code and data are conducted within the boundaries of agreed-upon terms.

As indicated in blocks 212 and 214, the process of utilizing the data security broker system includes initiating a self-destruction of the containerized code and data, as well as terminating the process between the API and the calling party in order to ensure that sensitive code and data are securely erased. The self-destruction and termination phases, indicated as blocks 212 and 214 respectively, form the final and crucial steps in the process flow of the data security broker system, ensuring the secure disposal of sensitive code and data.

The Self-Destruction phase is activated once the predetermined number of uses, as monitored in the previous phase, is reached. This phase is critical for maintaining the integrity and confidentiality of the data and code, particularly in environments where data security is paramount. From a technical standpoint, the initiation of this phase involves software mechanisms embedded within the broker application. These mechanisms are designed to trigger the self-destruction process automatically once the usage limits are met. This process typically runs on secure servers or cloud infrastructure, equipped with fail-safes to prevent any unauthorized attempts to halt or reverse the destruction process. In practical embodiments, the self-destruction might involve the deletion of encryption keys, rendering the data useless, or the overwriting of data storage areas to ensure no residual data can be recovered. For instance, in a scenario where a financial institution uses the broker system for sensitive transactions, once the set number of transactions is reached, the container housing the transaction code and related data initiates a secure wipe, leaving no traces behind.

The termination phase marks the end of the process, ensuring a clean and secure conclusion to the data and code usage cycle. This phase involves the broker system cutting off any existing connections between the API and the calling parties, effectively sealing off access to the now-destroyed data and code. From a hardware and computing perspective, this might involve shutting down communication channels, revoking access tokens, or even temporarily disabling APIs to prevent any lingering connections. In more sophisticated systems, this phase might also include a comprehensive system check, verifying that all sensitive data and code have indeed been securely erased and that no residual data remains in any part of the system.

For example, in some embodiments, once the data has been used for the predetermined number of analyses, the broker application not only initiates the self-destruction of the research data but also terminates the requesting entity or party's access to the data repository, ensuring complete closure of the data access cycle. In essence, the self-destruction and termination phases are integral to the data security broker system, acting as the final safeguards in the data lifecycle. These phases ensure that sensitive data and code are not just used securely but also disposed of securely, leaving no room for data breaches or unauthorized access, and providing peace of mind to all stakeholders involved.

As will be appreciated by one of ordinary skill in the art, the present disclosure may be embodied as an apparatus (including, for example, a system, a machine, a device, a computer program product, and/or the like), as a method (including, for example, a business process, a computer-implemented process, and/or the like), as a computer program product (including firmware, resident software, microcode, and the like), or as any combination of the foregoing. Many modifications and other embodiments of the present disclosure set forth herein will come to mind to one skilled in the art to which these embodiments pertain having the benefit of the teachings presented in the foregoing descriptions and the associated drawings. Although the figures only show certain components of the methods and systems described herein, it is understood that various other components may also be part of the disclosures herein. In addition, the method described above may include fewer steps in some cases, while in other cases may include additional steps. Modifications to the steps of the method described above, in some cases, may be performed in any order and in any combination.

Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system for enhanced encryption orchestration and application integration frameworks, the system comprising:
   a processing device;
   a non-transitory storage device containing instructions when executed by the processing device, causes the processing device to perform the steps of:
   initializing a broker application to act as a data security broker within a computing environment;
   providing an application programming interface (API) through the broker application for external application interaction;
   receiving and processing a request from an external application via the provided API for access to encrypted code and data;
   containerizing the encrypted code and data within an isolated environment, wherein the container is subject to predefined rules governing access and usage;
   monitoring usage of containerized code and data to ensure adherence to the predefined rules governing access and usage;
   initiating self-destruction of the container upon reaching a predetermined usage limit or condition; and
   securely erasing all sensitive data and code after use.

2. The system of claim 1, wherein the system is further configured to: generate a unique encryption key for each instance of code and data interaction, disseminating the key to the calling application via the provided API.

3. The system of claim 1, wherein the system is further configured to: implement predefined rules within each container of the containerized code and data, dictating conditions for accessing and using the contents.

4. The system of claim 3, wherein the conditions for accessing and using the contents further comprise a limited number of accesses or application-specific access to the contents.

5. The system of claim 1, wherein the system is further configured to: allow for configurable usage limits on the containerized code and data, wherein the limits are defined based on number of uses or time-based criteria.

6. The system of claim 1, wherein the system is further configured to: utilize cloud-based environments and services to host the broker application.

7. The system of claim 1, wherein the system is further configured to: provide a logging mechanism, documenting all interactions with the containerized code and data, including access requests, usage patterns, and self-destruction events.

8. A computer program product for enhanced encryption orchestration and application integration frameworks, the computer program product comprising a non-transitory computer-readable medium comprising code causing an apparatus to:
   initialize a broker application to act as a data security broker within a computing environment;
   provide an application programming interface (API) through the broker application for external application interaction;
   receive and process a request from an external application via the provided API for access to encrypted code and data;
   containerize the encrypted code and data within an isolated environment, wherein the container is subject to predefined rules governing access and usage;
   monitor usage of containerized code and data to ensure adherence to the predefined rules governing access and usage;
   initiate self-destruction of the container upon reaching a predetermined usage limit or condition; and
   securely erase all sensitive data and code after use.

9. The computer program product of claim 8, wherein the code further causes the apparatus to: generate a unique encryption key for each instance of code and data interaction, disseminating the key to a calling application via the provided API.

10. The computer program product of claim 8, wherein the code further causes the apparatus to: implement predefined rules within each container of the containerized code and data, dictating conditions for accessing and using the contents.

11. The computer program product of claim 10, wherein the conditions for accessing and using the contents further comprise a limited number of accesses or application-specific access to the contents.

12. The computer program product of claim 8, wherein the code further causes the apparatus to: allow for configurable usage limits on the containerized code and data, wherein the limits are defined based on number of uses or time-based criteria.

13. The computer program product of claim 8, wherein the code further causes the apparatus to: utilize cloud-based environments and services to host the broker application.

14. The computer program product of claim 8, wherein the code further causes the apparatus to: provide a logging mechanism, documenting all interactions with the containerized code and data, including access requests, usage patterns, and self-destruction events.

15. A method for enhanced encryption orchestration and application integration frameworks, the method comprising:
   initializing a broker application to act as a data security broker within a computing environment;
   providing an application programming interface (API) through the broker application for external application interaction;
   receiving and processing a request from an external application via the provided API for access to encrypted code and data;
   containerizing the encrypted code and data within an isolated environment, wherein the container is subject to predefined rules governing access and usage;
   monitoring usage of containerized code and data to ensure adherence to the predefined rules governing access and usage;
   initiating self-destruction of the container upon reaching a predetermined usage limit or condition; and
   securely erasing all sensitive data and code after use.

16. The method of claim 15, wherein the method further comprises: generating a unique encryption key for each instance of code and data interaction, disseminating the key to a calling application via the provided API.

17. The method of claim 15, wherein the method further comprises: implementing predefined rules within each container of the containerized code and data, dictating conditions for accessing and using the contents.

18. The method of claim 16, wherein the conditions for accessing and using the contents further comprise a limited number of accesses or application-specific access to the contents.

19. The method of claim 15, wherein the method further comprises: allowing for configurable usage limits on the containerized code and data, wherein the limits are defined based on number of uses or time-based criteria.

20. The method of claim 15, wherein the method further comprises: providing a logging mechanism, documenting all interactions with the containerized code and data, including access requests, usage patterns, and self-destruction events.

* * * * *